United States Patent
Lee et al.

(10) Patent No.: US 10,643,320 B2
(45) Date of Patent: May 5, 2020

(54) ADVERSARIAL LEARNING OF PHOTOREALISTIC POST-PROCESSING OF SIMULATION WITH PRIVILEGED INFORMATION

(71) Applicant: Toyota Research Institute, Inc., Los Altos, CA (US)

(72) Inventors: Kuan-Hui Lee, Redwood City, CA (US); German Ros, San Francisco, CA (US); Adrien D. Gaidon, Mountain View, CA (US); Jie Li, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 171 days.

(21) Appl. No.: 15/893,864

(22) Filed: Feb. 12, 2018

(65) Prior Publication Data
US 2019/0147582 A1    May 16, 2019

Related U.S. Application Data

(60) Provisional application No. 62/586,506, filed on Nov. 15, 2017.

(51) Int. Cl.
*G06K 9/62*    (2006.01)
*G06T 7/00*    (2017.01)
(Continued)

(52) U.S. Cl.
CPC ............ *G06T 7/0002* (2013.01); *G06T 5/005* (2013.01); *G06T 7/149* (2017.01); *G06T 7/187* (2017.01);
(Continued)

(58) Field of Classification Search
CPC ....... G06T 7/0002; G06T 11/00; G06T 7/187; G06T 7/149; G06T 2207/20081;
(Continued)

(56) References Cited

U.S. PATENT DOCUMENTS 8,588,470 B2   11/2013   Serrano et al.
8,687,021 B2   4/2014    Bathiche et al.
(Continued)

OTHER PUBLICATIONS

Souly Nasim et al: "Semi Supervised Semantic Segmentation Using Generative Adversarial Network", 2017 IEEE International Conference on Computer Vision (ICCV), IEEE, Oct. 22, 2017 (Oct. 22, 2017), pp. 5689-5697, XP033283449, DOI: 10.1109/ICCV.2017.606 (Year: 2017).*

(Continued)

*Primary Examiner* — Andrew M Moyer
(74) *Attorney, Agent, or Firm* — Dinsmore & Shohl LLP

(57) ABSTRACT

Systems and method for generating photorealistic images include training a generative adversarial network (GAN) model by jointly learning a first generator, a first discriminator, and a set of predictors through an iterative process of optimizing a minimax objective. The first discriminator learns to determine a synthetic-to-real image from a real image. The first generator learns to generate the synthetic-to-real image from a synthetic image such that the first discriminator determines the synthetic-to-real image is real. The set of predictors learn to predict at least one of a semantic segmentation labeled data and a privileged information from the synthetic-to-real image based on at least one of a known semantic segmentation labeled data and a known privileged information corresponding to the synthetic image. Once trained, the GAN model may generate one or more photorealistic images using the trained GAN model.

19 Claims, 9 Drawing Sheets

(51) Int. Cl.
  *G06T 7/149* (2017.01)
  *G06T 7/187* (2017.01)
  *G06T 11/00* (2006.01)
  *G06T 5/00* (2006.01)

(52) U.S. Cl.
  CPC .... *G06T 11/00* (2013.01); *G06T 2207/20036* (2013.01); *G06T 2207/20081* (2013.01); *G06T 2207/20084* (2013.01); *G06T 2207/30252* (2013.01)

(58) Field of Classification Search
  CPC . G06T 2207/20036; G06T 2207/20084; G06T 5/005; G06T 2207/30252
  USPC .......................................................... 382/156
  See application file for complete search history.

(56) References Cited

U.S. PATENT DOCUMENTS

| | | | |
|---|---|---|---|
| 8,971,612 | B2 | 3/2015 | Shotton et al. |
| 9,363,483 | B2 | 6/2016 | Bulan et al. |
| 9,384,448 | B2 | 7/2016 | Tu et al. |
| 9,600,936 | B2 | 3/2017 | Boivin et al. |
| 9,760,690 | B1 | 9/2017 | Petkov et al. |
| 9,767,565 | B2 | 9/2017 | Estrada et al. |
| 2008/0232707 | A1 | 9/2008 | Lee et al. |
| 2016/0132786 | A1 | 5/2016 | Balan et al. |
| 2016/0284095 | A1 | 9/2016 | Chalom et al. |
| 2017/0098172 | A1 | 4/2017 | Ellenbogen et al. |
| 2018/0357514 | A1* | 12/2018 | Zisimopoulos ...... G06K 9/6256 |
| 2019/0080206 | A1* | 3/2019 | Hotson ................. G06K 9/6264 |

OTHER PUBLICATIONS

Goodfellow, Ian, et al., "Generative adversarial networks", https://arxiv.org/abs/1406.2661 Published: Jun. 10, 2014.
Bousmalis, Konstatinos, et al., "Unsupervised pixel-level domain adaptation with generative adversarial networks", https://arxiv.org/abs/1612.05424 Published: Dec. 16, 2016.
Luan, Fujun, et al., "Deep Photo Style Transfer," https://arxiv.org/abs/1703.07511 Published: Mar. 22, 2017.
Jing, Youngcheng, et al., "Neural Style Transfer: A Review," https://arxiv.org/abs/1705.04058 Published: May 11, 2017.
Gaidon, Adrien, et al., "Virtual Worlds as Proxy for Multi-Object Tracking Analysis," https://arxiv.org/abs/1605.06457 Published: May 20, 2016.
Peng, Xingchao, et al., "Synthetic to Real Adaptation with Generative Correlation Alignment Networks," https://arxiv.org/abs/1701.05524 Published Jan. 19, 2017.
Shrivastava, Ashish, et al., "Learning From Simulated and Unsupervised Images Through Adversarial Training", https://arxiv.org/abs/1612.07828 Published Dec. 22, 2016.
Zhu, Jun-Yan, et al., "Unpaired Image-to-Image Translation using Cycle-Consistent Adversarial Networks," https://arxiv.org/abs/1703.10593 Published Mar. 30, 2017.
Apple Inc., "Improving the Realism of Synthetic Images," https://machinelearning.apple.com/2017/07/07/GAN.html Published Jul. 2017.
Eigen, et al., "Predicting Depth, Surface Normals and Semantic Labels with a Common Multt-Scale Convolutional Architecture," https://arXiv.org/abs/1411.4734 Published Nov. 18, 2014.
Eigen, et al., "Depth Map Prediction from a Single Image using a Multi-Scale Deep Network," https://arxiv.org/abs/1406.2283 Published Jun. 9, 2014.

* cited by examiner

ADVERSARIAL LEARNING OF PHOTOREALISTIC POST-PROCESSING OF SIMULATION WITH PRIVILEGED INFORMATION

CROSS-REFERENCE TO RELATED APPLICATIONS

This application claims the benefit of U.S. Provisional Application No. 62/586,506, entitled "ADVERSARIAL LEARNING OF PHOTOREALISTIC POST-PROCESSING OF SIMULATION WITH PRIVILEGED INFORMATION" filed Nov. 15, 2017, the entirety of which is hereby incorporated by reference.

TECHNICAL FIELD

The present specification generally relates to systems and methods to generate synthetic images and, more specifically, to systems and methods for training a generative adversarial network that generates synthetic images from a simulator that appear photorealistic.

BACKGROUND

Performance of Machine Learning (ML) models depends on the quantity, diversity, and quality of training examples used to train the model. For example, to train an autonomous vehicle vision system to recognize, identify, and autonomously navigate an environment, the training examples must be diverse in content, realistic, and numerous. Currently, a method to achieve this goal includes manually labeling photos of real-world environments, but this method may be time consuming and limited to the dataset of real-world environments. Another method includes generating simulated environments from a simulator. However, images generated in such a manner may lack photorealism, which may result in domain adaptation issues. For example, a ML model may learn to identify an object, but the object it learns to identify may be a refined rendering of a synthetic object that does not appear the same in a real-world environment. To improve image generation and bridge the gap between simulated and real-world domains, some methods employ Generative Adversarial Networks (GAN). In general, GANs are ML models having two components, i) a generator, which generates images, and ii) a discriminator, which is tasked with differentiating between example real images and generated ones. Some current GAN systems attempt to learn a rendering function from scratch, which does not close the gap between real-world images and synthetic images.

Accordingly, a need exists for improved systems and methods for generating synthetic photorealistic images.

SUMMARY

In one embodiment, a method for generating photorealistic images includes training a generative adversarial network (GAN) model by jointly learning a first generator, a first discriminator, and a set of predictors through an iterative process of optimizing a minimax objective and generating one or more photorealistic images using the trained GAN model. The first discriminator learns to determine a synthetic-to-real image from a real image. The first generator learns to generate the synthetic-to-real image from a synthetic image such that the first discriminator determines the synthetic-to-real image is real. The set of predictors learn to predict at least one of a semantic segmentation labeled data and a privileged information from the synthetic-to-real image based on at least one of a known semantic segmentation labeled data and a known privileged information corresponding to the synthetic image.

In another embodiment, a computer-implemented system for generating photorealistic images from a synthetic image, the computer-implemented system includes a processor and a non-transitory computer-readable medium storing computer readable instructions. When the computer readable instructions are executed by the processor, they cause the processor to train the generative adversarial network (GAN) model including a first generator, a first discriminator, and a set of predictors by jointly learning the first generator, the first discriminator, and the set of predictors through an iterative process of optimizing a minimax objective and generate one or more photorealistic images using the trained GAN model. The first discriminator learns to determine a synthetic-to-real image from a real image. The first generator learns to generate the synthetic-to-real image from the synthetic image such that the first discriminator determines the synthetic-to-real image is real. The set of predictors learn to predict at least one of a semantic segmentation labeled data and a privileged information from the synthetic-to-real image based on at least one of a known semantic segmentation labeled data and a known privileged information corresponding to the synthetic image.

In another embodiment, a method for generating photorealistic images includes training a generative adversarial network (GAN) model by jointly learning a first generator, a first discriminator, and a set of predictors through an iterative process. The iterative process includes the steps of generating, with the first generator, a synthetic-to-real image from a synthetic image simulated by a simulator and determining, with the first discriminator, whether the synthetic-to-real image is real or fake and whether a real image from a dataset of real images is real or fake. The iterative process also includes predicting, with the set of predictors, at least one of a labeled data and privileged information from the synthetic-to-real image. The iterative process also includes training the first generator, the first discriminator, and the set of predictors by optimizing a minimax objective where the first generator learns to generate the synthetic-to-real image from the synthetic image simulated by the simulator such that the first discriminator determines the synthetic-to-real image is real. Additionally, the first discriminator learns to determine the synthetic-to-real image from the real image, such that a difference between the synthetic-to-real image and the real image is minimized. Furthermore, the set of predictors learn to predict at least one of the labeled data and the privileged information from the synthetic-to-real image based on at least one of the labeled data and the privileged information from the simulator.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein include system and methods for training a Generative Adversarial Network (GAN) model (a class of artificial intelligence used in unsupervised machine learning) to generate synthetic images that are photorealistic such that they may be used as training data for Machine Learning (ML) models. A ML model may be applied as a post-processing step to the synthetic data, independent of the image simulator. In general, some embodiments include a machine learning framework to learn a mapping function in raw pixel space from the domain of rendered synthetic images/videos (e.g., from a simulator) to the domain of real-world images/videos. Once the parameters for the model have been learned, the model can be applied as a generic post-processing algorithm to improve the photorealism of any synthetic data.

Additionally, simulator generated data such as a set of labels (e.g., semantic segmentation labels) and privileged information (e.g., instance segmentation information, optical flow information, depth information, object detection information, etc.) may be obtained from the simulator to enhance the performance of generating photorealistic data. A set of predictors may be trained based on the privileged information generated and provided by the simulator to predict the privileged information in synthetic-to-real images generated by the generator of the GAN model.

Embodiments of the present disclosure are directed to systems and methods of generating synthetic images (e.g., simulated data) from a simulator that appears more photorealistic along with predicting privileged information and implementing the generated images to create ML models.

Figure 1:
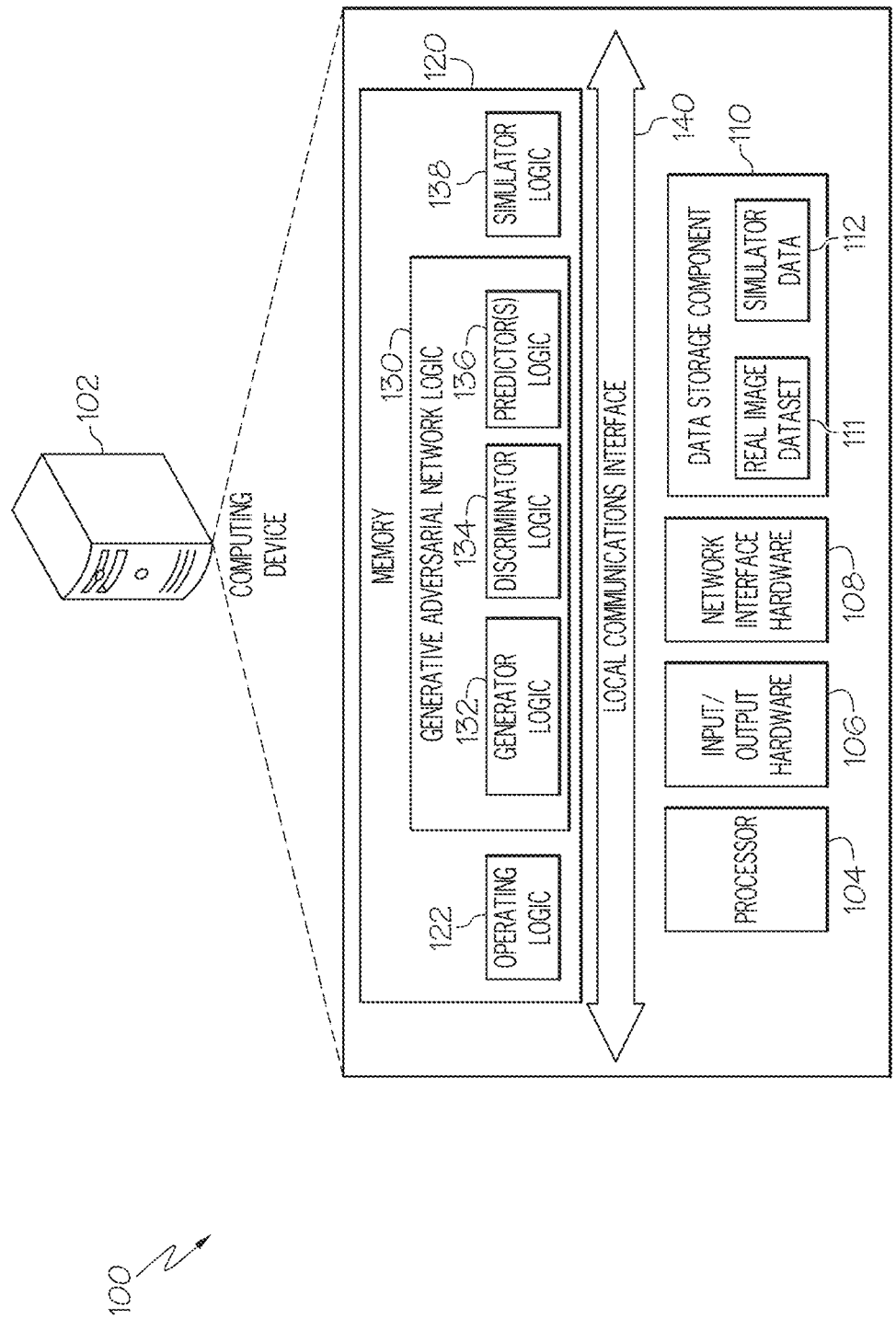
FIG. 1 depicts a system for training and generating photorealistic images from synthetic images, according to one or more embodiments shown and described herein.

Turning now to the drawings wherein like numbers refer to like structures, and particularly to FIG. 1, a system 100 for training and generating photorealistic images from synthetic image data is depicted. In some embodiments, the system 100 may be employed on a computing device 102. The computing device 102 includes a processor 104, input/output hardware 106, the network interface hardware 108, a data storage component 110 (which may store real-world image data 111, simulator data 112, and/or other data), a memory component 120, and a local communications interface 140. The memory component 120 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 102 and/or external to the computing device 102.

The processor 104 may include any processing component operable to receive and execute instructions (such as from a data storage component 110 and/or the memory component 120). Additionally, the input/output hardware 106 may include and/or be configured to interface with the sensors, devices, and other components.

The memory 120 may comprise RAM, ROM, flash memories, hard drives, or any non-transitory memory device capable of storing machine-readable instructions such that the machine-readable instructions can be accessed and executed by the processor 104. The machine-readable instruction set may comprise logic or algorithm(s) written in any programming language of any generation (e.g., 1GL, 2GL, 3GL, 4GL, or 5GL) such as, for example, machine language that may be directly executed by the processor 104, or assembly language, object-oriented programming (OOP), scripting languages, microcode, etc., that may be compiled or assembled into machine readable instructions and stored in the memory 120. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single memory 120, other embodiments may include more than one memory module.

The memory 120 may store operating logic 122, generative adversarial network logic 130 (which may include generator logic 132, discriminator logic 134, the predictor logic 136 and/or other logic), and simulator logic 138. The generator logic 132, the discriminator logic 134, and the predictor logic 136 may each include a plurality of different pieces of logic, each of which may be embodied as a computer program, firmware, and/or hardware, as an example. A local communications interface 140 is also included in FIG. 1 and may be implemented as a bus or other communication interface to facilitate communication among the components of the computing device 102.

The network interface hardware 108 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the computing device 102 and other computing devices, such as a mobile device, a server, etc.

The operating logic 122 may include an operating system and/or other software for managing components of the computing device 102. As described in more detail herein, the generative adversarial network logic 130 may reside in the memory 120 and may be configured to cause the processor 104 to train the GAN model. Similarly, the generator logic 132 may cause the processor 104 to train a generator to generate photorealistic synthetic image data, the discriminator logic 134 may cause the processor 104 to train a discriminator to distinguish between synthetic image data and real-world image data, and the predictor logic 136 may cause the processor 104 to train a set of predictors to predict privileged information from the photorealistic synthetic image data generated by the generator. Additionally, the simulator logic 138 may cause the processor 104 to generate synthetic image data along with corresponding privileged information.

It should be understood that while the components in FIG. 1 are illustrated as residing within the computing device 102, this is merely an example. In some embodiments, one or more of the components may reside external to the computing device 102. It should also be understood that, while the computing device 102 is illustrated as a single device, this is also merely an example. In some embodiments, the operating logic 122, the generative adversarial network logic 130 (which may include the generator logic 132, the discriminator logic 134, the predictor logic 136 and/or other logic), and the simulator logic 138 may reside on different computing devices. As an example, one or more of the functionality and/or components described herein may be provided by a computing device and/or mobile device, which may be coupled to the computing device 102 via a network, such as a local network and/or a wide area network.

Additionally, while the computing device 102 is illustrated with the operating logic 122, the generative adversarial network logic 130 (which may include the generator logic 132, the discriminator logic 134, the predictor logic 136 and/or other logic), and the simulator logic 138 as separate logical components, this is also an example. In some embodiments, a single piece of logic may cause the computing device 102 to provide the described functionality.

Figure 2:
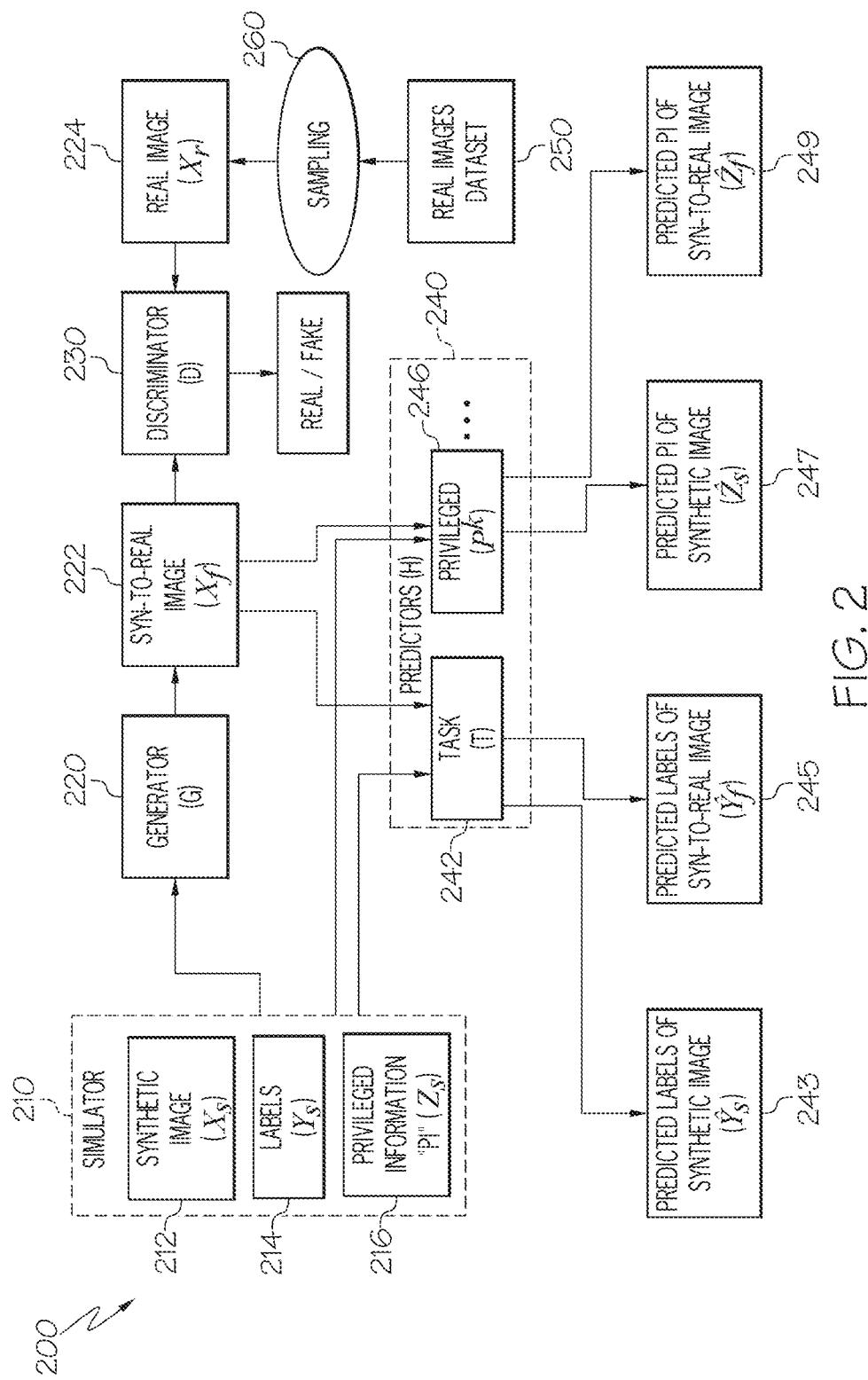
FIG. 2 depicts a flow diagram of a Simulator Privileged Information Generative Adversarial Network (SPIGAN) model, according to embodiments described herein is depicted.

Turning to FIG. 2, a flow diagram of a Simulator Privileged Information Generative Adversarial Network (SPIGAN) model 200 including inputs and outputs according to embodiments described herein is depicted. The SPIGAN model 200 is an adversarial learning method for learning to generate photorealistic synthetic images from unpaired, unlabeled real-world image data in a GAN-based unsupervised model. In general, GANs are artificial intelligence algorithms used in unsupervised machine learning that implements a system of neural networks contesting each other in a zero-sum game framework. As described herein, this framework may be utilized for learning a generative model for generating images with the distribution of real-world domain. The GAN-based framework is adapted to jointly learn a generator 220, a discriminator 230, and a set of predictors 240. In some embodiments, the GAN-based framework, which makes up a portion of the SPIGAN model 200, utilizes a simulator 210 and a real-world image dataset 250.

In some embodiments, the simulator 210 creates a synthetic image 212, a set of labels 214, and privileged information 216 corresponding to the synthetic image 212. The simulator 210 may be a combination of software and hardware configured to create a synthetic image 212 of an environment. For example, the simulator 210 may create, for example, a synthetic image 212 of a cityscape having, buildings, roads, people, green spaces, and/or the like. Furthermore, in an application such as training a vision system for an autonomous vehicle it may be advantageous for the simulator 210 to create a synthetic image 212 from the point of view of a vehicle on a street. The simulator 210 may further create a set of labels 214 (e.g., semantic segmentation labels) and privileged information 216 (e.g., depth information, instance segmentation information, object detection information, optical flow information, etc.) that correspond to the synthetic image 212. The simulator 210 may readily create the set of labels 214 and privileged information 216 because the simulator 210 may already internally compute relationships between simulated objects depicted within the synthetic image 212. As such, the simulator 210 includes a wealth of information about the synthetic image 212, which may be advantageous for training the SPIGAN model 200.

In some embodiments, the simulator 210 may utilize a collection of real-world data collected from multiple synchronized sensors (e.g., cameras, GPS sensors, IMU sensors, LIDAR sensors, radar sensors, and/or the like). The real-world data may be collected from a moving platform (e.g., a vehicle or robot) as it navigates an environment. The collection of real-world data may be further annotated with external meta-data about the scene (e.g., maps, weather reports, user-provided meta-data, or the like) to recreate the recorded scenes using the simulator 210. For example, Gaidon et al. describes an approach in "Virtual Worlds as Proxy for Multi-Object Tracking Analysis", which is incorporated herein by reference in its entirety.

In some embodiments, the simulator 210 may adjust one simulated scene to create an alternate simulated scene, for example and without limitation, a sunny scene may be adjusted to be a rainy scene, a scene may be adjusted from night to day, or a scene may be adjusted from morning to evening, or the like. This allows the simulator 210 to generate a large number of synthetic images 212 resembling a real-world environment having various weather conditions or other environmental changes without needing a particular real-world image of the environment under the various weather conditions and environmental conditions. As such, the simulator 210 may also create variations of the reconstructed scene by altering the environments, objects, agents, trajectories, weather conditions, or any other factor.

In some embodiments, the output of the simulator 210 is communicatively coupled to the input of the generator 220. Using the synthetic image 212 as an input, the generator 220 generates a synthetic-to-real image 222. The generator 220 of the SPIGAN model 200 learns (e.g., a pixel-level mapping function) to map the synthetic image 212 to a synthetic-to-real image 222 such that the discriminator 230 is unable to discern the synthetic-to-real image 222 from a real-world image 224. In some embodiments, the training objective of the generator 220 is to increase the error rate of the discriminator 230, for example, in determining a synthetic-to-real image 222 is a real-world image 224. In other words, the generator 220 is trying to fool the discriminator 230, that is, force the discriminator 230 into determining that the synthetic-to-real image 222 is a real-world image 224.

In turn, the discriminator 230 receives the synthetic-to-real image 222 and the real-world image 224. In some embodiments, the real-world image 224 is provided to the discriminator 230 from a real-world image dataset 250 selected by a sampling module 260. The sampling module 260 may randomly select an image from the real-world image dataset 250. The discriminator 230 learns to distinguish between a synthetic-to-real image 222 and a real-world image 224 by playing an adversarial game with the generator 220 until an equilibrium point is reached.

In addition to learning the generator 220 and the discriminator 230, a set of predictors 240 are learned from the synthetic-to-real image 222 and data from the simulator 210. The set of predictors 240 may include a task predictor 242 and one or more privileged information predictors 246. In some embodiments, the task predictor 242 predicts semantic segmentation in the synthetic image 212 and generates predicted semantic segmentation data 243 (e.g., labels) for the synthetic image 212. Additionally, the task predictor 242 predicts semantic segmentation in the synthetic-to-real image 222 and generates predicted semantic segmentation data 245 (e.g., labels). Similarly, the one or more privileged information predictors 246 may predict privileged information such as depth information, object detection information, optical flow information, and/or the like from the synthetic image 212 and/or the synthetic-to-real image 222, thereby returning predicted privileged information of the synthetic image 247 and the synthetic-to-real image 249, respectively.

In some embodiments, the set of predictors 240, including the task predictor 242 and privileged information predictors 246, learn to predict semantic segmentation labels and privileged information of the synthetic-to-real image 222 through training images provided from the simulator 210 (i.e., the synthetic image 212) and the generator 220 (i.e., the synthetic-to-real image 222), respectively. Additionally, the sets of labels 214 and privileged information 216 created by the simulator 210 are directly propagated from the simulator 210 to supervise the training of the set of predictors 240.

In general, the SPIGAN model is based on performing unsupervised domain adaptation by leveraging the combination of fully labelled synthetic images 212 and privileged information 216 obtained from a simulated environment (i.e., a source domain) and unlabeled real-world image 224 from a domain of interest (i.e., a target domain). The source domain serves as an idealized representation of the world, offering full control of the environment setup including adjusting weather conditions, type of scene, sensor configurations, and the automatic generation of raw sensory data, rich labels and privileged information, such as depth, optical flow, and per-pixel semantic labels among others. The target domain represents a new real-world environment in which information such as semantic segmentation is desired. Accordingly, in some embodiments, the SPIGAN model may be trained to perform a desired specialized task, such as semantic segmentation, by leveraging fully labeled semantic segmentation data and privileged information from the simulator (i.e., the source domain) and unlabeled real-world image data from the target domain, to jointly perform the adaptation while learning the set of predictors.

For example, assuming $X_s = \{(x_s^{(i)}, y_s^{(i)}, z_s^{(i)}), i=1 \ldots N^s\}$ is a set of $N^s$ synthetic images $x_s$ with their labels $y_s$ and privileged information PI $z_s$. Also, let $X_r = \{(x_r^{(j)}), j=1 \ldots N^r\}$ be a set of $N^r$ unlabeled real-world images 224, $x_r$. SPIGAN jointly learns a generator 220, $G(x; \theta_G)$, a discriminator 230, $D(x; \theta_D)$, a task predictor 242, $T(x; \theta_T)$, and one or more privileged information predictors 246, $P^k(x; \theta_{pk})$. In some embodiments, $\theta_G$, $\theta_D$, $\theta_T$, and $\theta_{pk}$ represent the parameters of the generator, discriminator, task predictor, and the one or more privileged information predictors that may be updated during the training of the SPIGAN model. Still referring to FIG. 2, the generator 220, G, may be a mapping function that transforms a synthetic image 212, $x_s \in X_s$ (source domain) to a synthetic-to-real image 222, $x_f \in X_f$ (adapted domain), which is trained to be statistically close to $X_r$, i.e., $d(G(x; \theta_G), x_r) < \epsilon$. Additionally, as referenced above, the discriminator 230, D, is trained to tell the difference between a synthetic-to-real image 222 $x_f$ and a real-world image 224, $x_r$, through an adversarial process with the generator 220, G, until reaching an equilibrium point.

The task predictor 242, T, is learned on the synthetic images 212, $x_s$, and synthetic-to-real images 222, $G(x_s; \theta_G)$, to predict the synthetic labels, $y_s$, (i.e., predicted semantic segmentation data 245) in the synthetic-to-real image 222, assuming the generator 220, G, is label-preserving. Similarly, the privileged information predictors 246 $\{P^k\}$ are trained on the same input but to predict the privileged information 216, PI $z_s$, in the synthetic-to-real image 222, assuming the generator 220, G, is PI-preserving.

In some embodiments, the goal is to improve the generalization performance of the task predictor T and avoid overfitting to the synthetic image 212 (source domain). As such, all the models are jointly trained to (i) use the privileged information PI via the privileged information predictors 246 $\{P^k\}$ to regularize the learning of the task predictor T, and (ii) encourage the generator 220, G, to model the target domain (e.g., real-world image dataset 250) while being label- and PI-preserving.

The accuracy of the task predictor 242 (T) may be influenced by the set of privileged information predictors 246 $\{P^k\}$, that are trained in a supervised fashion using the privileged information 216 available from the simulator 210 (i.e., source domain). In some embodiments, the task predictor 242 (T) and privileged information predictors 246 $\{P^k\}$ are trained from the source domain $X_s$ (i.e., synthetic image 212) and the adapted domain $X_f$ (i.e., synthetic-to-real image 222). To achieve this, the sets of labels 214 and privileged information 216 created by the simulator 210 are directly propagated from the simulator 210 to supervise the training of the set of predictors 240 (i.e., the task predictor 242 (T) and privileged information predictors 246 $\{P^k\}$).

To achieve good performance when training the SPIGAN model, in some embodiments, a consistent set of loss functions and domain specific constraints related to the main prediction task need to be designed and optimized. In some embodiments, the goal is to optimize a minimax objective. For example, the minimax objective includes a set of loss functions comprising an adversarial loss ($\mathcal{L}_{GAN}$), a task prediction loss ($\mathcal{L}_T$), a privileged information predictors loss ($\mathcal{L}_P$), and a perceptual regularization ($\mathcal{L}_{perc}$) characterized by Equation 1, where $\alpha$, $\beta$, $\gamma$, $\delta$ are weighting parameters and $\theta_G$, $\theta_D$, $\theta_T$, and $\theta_{pk}$ represent the parameters of the generator, discriminator, task predictor, and the one or more privileged information predictors, respectively, which may be optimized during the iterative training process described herein.

$$\min_{\theta_G, \theta_T} \theta_P \max_{\theta_D} \alpha \mathcal{L}_{GAN} + \beta \mathcal{L}_T + \gamma \mathcal{L}_P + \delta \mathcal{L}_{perc} \qquad \text{Eq. 1}$$

In some embodiments, the adversarial loss ($\mathcal{L}_{GAN}$) is determined using a least square based adversarial loss, which can stabilize the training process and generate improved results. The adversarial loss ($\mathcal{L}_{GAN}$) may be characterized by Equation 2, where $\mathcal{F}_r$ (resp. $\mathcal{F}_s$) denotes the real-world (resp. synthetic) data distribution.

$$\mathcal{L}_{GAN}(D, G) = \mathbb{E}_{x_r \sim \mathcal{F}_r}[(D(x_r; \theta_D) - 1)^2] + \mathbb{E}_{x_s \sim \mathcal{F}_s}[(D(G(x_s; \theta_G); \theta_D))^2] \qquad \text{Eq. 2}$$

In some embodiments, the task predictor 242 is adapted by optimizing its loss over both synthetic images 212, $x_s$, and their adapted version, i.e., the synthetic-to-real images 222, $G(x_s; \theta_G)$. For example, this assumes the generator 220, G, is label-preserving, i.e., that $y_s$ can be used as a label for both images. While different tasks require different loss functions, the task of semantic segmentation employed, for example, as described herein, uses a standard cross-entropy loss ($\mathcal{L}_{CE}$) (Equation 3, where $\mathbb{1}_{[a=b]}$ is an indicator factor) over the images of size W×H and assuming a probability distribution over C semantic categories. For example, the semantic categories may include flat, construction, object, nature, sky, human, vehicle, and/or the like. The total combined task prediction loss ($\mathcal{L}_T$) for semantic segmentation may be characterized by Equation (4).

$$\mathcal{L}_{CE}(x, y) = \frac{-1}{WH} \sum_{u,v}^{W,H} \sum_{c=1}^{C} \mathbb{1}_{[c=y_{u,v}]} \log(T(x; \theta_T)_{u,v}) \qquad \text{Eq. 3}$$

$$\mathcal{L}_T(T, G) = \mathcal{L}_{CE}(x_s, y_s) + \mathcal{L}_{CE}(G(x; \theta_G), y_s) \qquad \text{Eq. 4}$$

In some embodiments, the privileged information predictors 246 are trained using a simple $\ell_1$-norm where the total loss for the privileged information predictors ($\mathcal{L}_P$) is defined by Equation 5.

$$\mathcal{L}_P(P,G) = \|P(x_s; \theta_P) - z_s\|_1 + \|P(G(x_s; \theta_G); \theta_P) - z_s\|_1 \qquad \text{Eq. 5}$$

In some embodiments, in order to bias the generated images to maintain the semantics of the source images (i.e., synthetic image 212), a perceptual loss is imposed as a constraint defined by Equation 6, where φ is mapping from image space to a pre-determined feature space.

$$\mathcal{L}_{perc} = \|\phi(x_s) - \phi(G(x; \theta_G))\|_{\ell_1} \qquad \text{Eq. 6}$$

In some instances, a standard adversarial training strategy is followed to optimize the joint learning objective of Equation 1. Updates are first made to the parameters of the discriminator 230, $\theta_D$, keeping all other parameters fixed. Then, the parameters of the discriminator 230, $\theta_D$, are fixed, and the parameters of the generator 220, $\theta_G$, one or more privileged information predictors 246, $\theta_P$, and the task predictor 242, $\theta_T$, are optimized. In some embodiments, this is accomplished through an iterative training process where both the parameters are updated multiple times before optimization is achieved.

The processor 104 may execute the simulator logic 138 to carry out the functionality of the simulator 210 described above. Similarly, the processor 104 may execute the generator logic 132 to carry out the functionality of the generator 220 described above. In some embodiments, the processor 104 may also execute the discriminator logic 134 to carry out the functionality of the discriminator 230 described above. Furthermore, the processor 104 may execute the predictor logic 136 to carry out the functionality of one or more predictors 240 as described herein.

Figure 3:
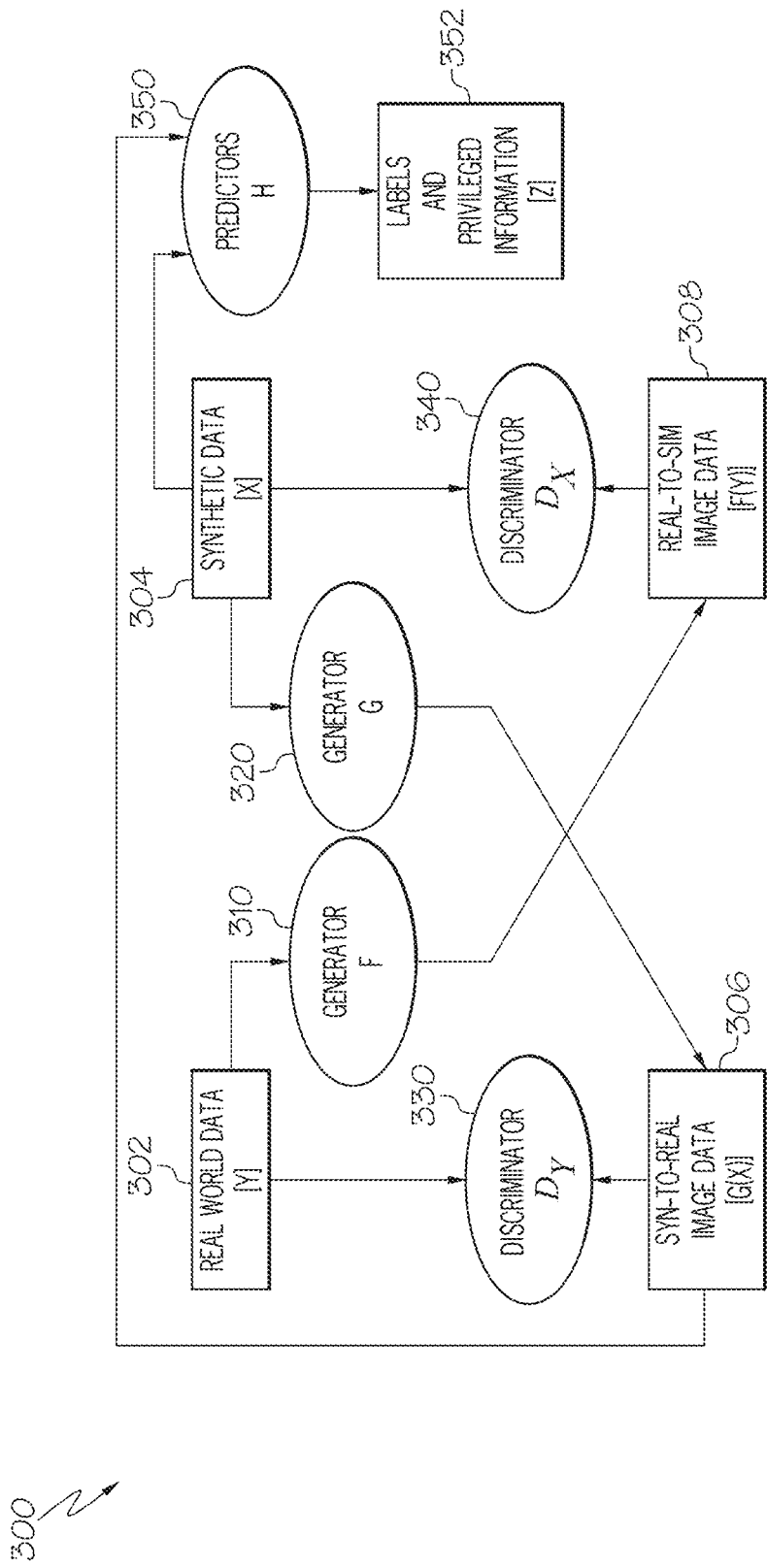
FIG. 3 depicts a flow diagram of a training stage of the SPIGAN model, according to embodiments described herein is depicted.

Referring now to FIG. 3, another flow diagram of a training stage of the SPIGAN model 300 is depicted. In some embodiments, the GAN-based framework may leverage a symmetric architecture. In such an embodiment, the system trains the SPIGAN model from a real-world data 302, Y, and the synthetic data 304, X, (e.g., a simulated reconstruction) to learn the parameters $\theta_G$ of the pixel mapping function, G, employed by a first generator 320 to map the synthetic data 304 to synthetic-to-real image data 306, such that $G(X; \theta_G) \cong Y$. As such, the synthetic-to-real image data 306 become photorealistic. As discussed above, a GAN model is a ML model including two components: a first generator 320, which is responsible for image generation, and a first discriminator 330, which is tasked with differentiating between example real images and generated ones. The learning of the first generator 320, G, involves trying to make a first discriminator 330, $D_Y$, determine synthetic-to-real image data 306 is real (i.e., indistinguishable from real-world image data 302 as determined by the first discriminator 330), thereby forcing the first generator 320, G, to generate more photorealistic images. In some embodiments, the SPIGAN model 300 may also leverage a symmetric architecture that generates real-to-simulated image data 308 from real-world data 302. For example, a second generator 310 learns a mapping function, F, by updating parameters, $\theta_F$, such that a second discriminator 340, $D_X$, incorrectly determines real-to-simulated image data 308 as synthetic data 304, i.e., $F(Y; \theta_F) \cong X$. The symmetric architecture improves generator quality by measuring cycle consistency (i.e., reconstructing back and forth between the domains Y and X).

In some embodiments, the model may also include privileged information, Z, as pseudo-ground truth in addition to the aforementioned objectives. The SPIGAN model 300 learns a set of predictors 350, H, that are tasked with predicting the privileged information available as an output from the simulator, e.g., $H(X; )\theta_H) \cong Z$ and $H(G(X); )\theta_H) \cong Z$. To learn a set of predictors 350, H, the set of predictors make a prediction of labels (e.g., semantic segmentation) and privileged information from the synthetic-to-real image data 306, which is supervised by the known labels and privileged information of the synthetic data 304 from the simulator. Parameters, $\theta_H$, of the set of predictors 350, H, are updated during each iteration of the SPIGAN model thereby learning and refining the set of predictors 350, H.

The simultaneous learning of the first and second generators 310, 320, the first and second discriminators 330, 340, and the set of predictors 350 encourages semantic and global consistency of the first generator 320 as a post-processing function. Each component may be jointly trained using a multi-task objective summing all the aforementioned individual objectives. This enables the SPIGAN model 300 to leverage privileged information known by the simulator to train the first and second generators 310, 320, the first and second discriminators 330, 340, and the set of predictors 350. This also ensures the use of privileged information Z as pseudo-ground truth for generating more realistic synthetic-to-real image data, 306, G(X).

Figure 4:
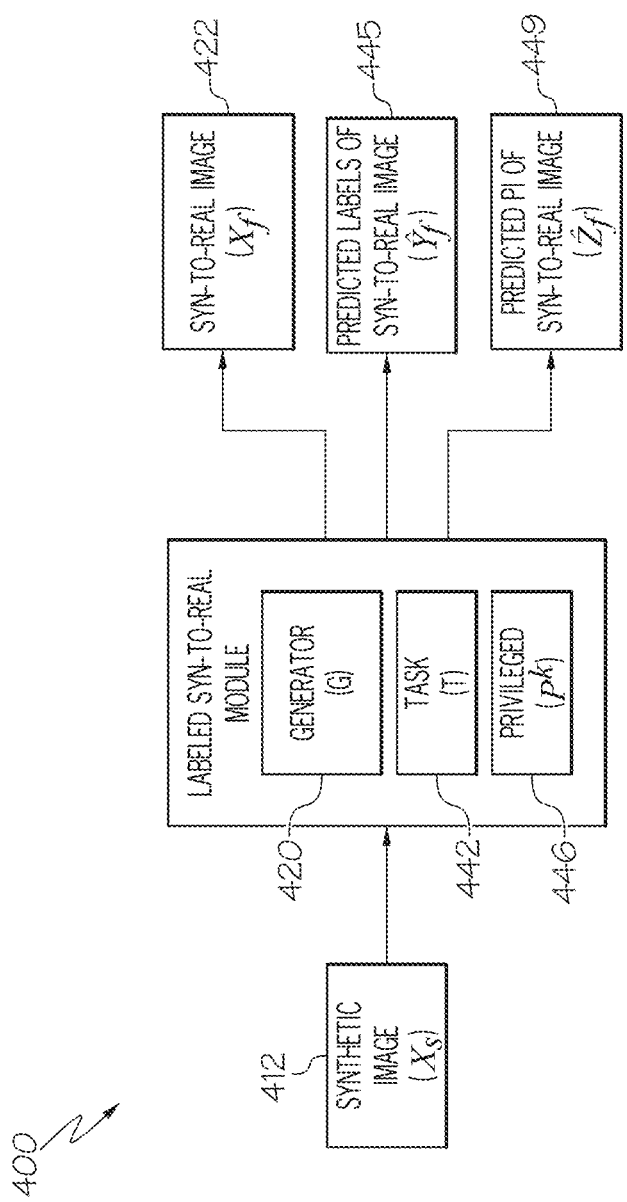
FIG. 4 depicts a flow diagram of a system employing the trained parameters of the SPIGAN model, according to embodiments described herein is depicted.

Referring to FIG. 4, a flow diagram of a system 400 employing the trained parameters of the SPIGAN model is depicted. Once a SPIGAN model is learned, the generator 420, which is trained to generate photorealistic synthetic-to-real image data 422 from synthetic image data 412 created by a simulator and the set of predictors including the task predictor 442 trained to predict semantic segmentation and the one or more privileged information predictors 446 trained to predict privileged information such as depth, optical flow, object detection, and/or the like are configured to receive a synthetic image 412 as an input. In turn, the generator 420 generates synthetic-to-real image data 422, the task predictor 442 predicts labels 445 for semantic segmentation corresponding to the synthetic-to-real image data 422, and the privileged information predictor 446 predicts privileged information 449 corresponding to the synthetic-to-real image data 422. As a result, the synthetic-to-real image data 422, labels 445 for semantic segmentation corresponding to the synthetic-to-real image data 422, and the privileged information 449 corresponding to the synthetic-to-real image data 422 may be used to train other ML models, such as a computer vision system for an autonomous vehicle. The efficient generation of a diverse labeled dataset of photorealistic image data will improve the training of other ML models, particularly, ML models which require semantic segmentation training data.

Figure 5:
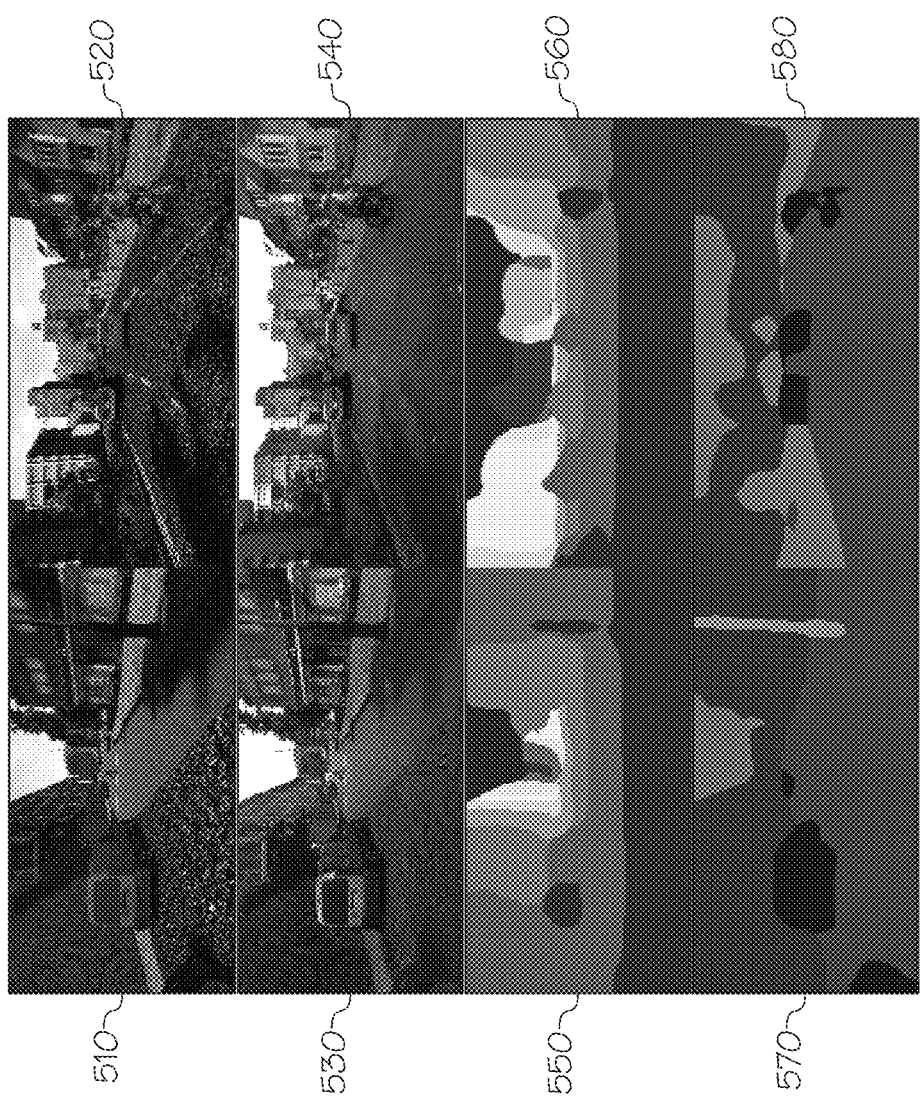
FIG. 5 depicts example inputs and outputs of the SPIGAN model, according to embodiments described herein is depicted.

Referring now to FIG. 5, two sets of example inputs and outputs of the SPIGAN model are depicted. The synthetic images 510 and 520 of an urban center, created by a simulator, are inputs to the SPIGAN model. The generator of the SPIGAN model maps the synthetic images 510 and 520 to photorealistic, synthetic-to-real images 530 and 540. In the embodiment depicted in FIG. 5, the privileged information predictor of the SPIGAN model predicts and outputs depth layer images 550 and 560 from the synthetic-to-real images 530 and 540. Finally, the task predictor of the SPIGAN model predicts and outputs sematic segmentation images 570 and 580 from the synthetic-to-real images 530 and 540.

Experimental Evaluation and Benchmarking

Referring now to FIGS. 6-9, experimental results are presented for the SPIGAN model as applied to urban (e.g., Cityscapes) and rural (e.g., Mapillary Vistas) scenes. The SPIGAN model was evaluated on the task of sematic segmentation in a real-world target domain for which training annotations are not available. Additionally, a comparison between training only on the source domain (no adaptation) and training a fully supervised upper bound on labeled data from the target domain was investigated. The SPIGAN model was also benchmarked against other models that were adapted for a fair comparison. That is, two domain adaptation methods were implemented as baselines in the experiment, CycleGAN as presented by Zhu et al. in "Unpaired image-to-image translation using cycle-consistent adversarial networks," and PixelDA presented by Bousmalis et al. in "Unsupervised Pixel-Level Domain Adaptation with Generic Adversarial Networks," each of which is incorporated herein by reference. First, a separate FCN8 segmentation network in the CycleGAN generated dataset was trained. Second, the PixelDA model was adapted for the task of semantic segmentation, more specifically, the task classifier was replaced with the FCN8s network. The same architecture was used for the generator, discriminator, and perceptual loss to keep the comparison fair.

To be consistent with semantic segmentation practices, the performance of seven semantic categories (e.g., seven categories: flat, construction, object, nature, sky, human, vehicle) were evaluated by using an Intersection-over-Union (IoU) metric for each category and mean Intersection-over-Union (mIoU) as the main validation metric. Both quantitative and qualitative results are presented to compare the proposed method, i.e., the SPIGAN model, to state-of-art domain adaptation methods on benchmark datasets, along with supervised training in target domain (upper bound) and supervised training in source domain (lower bound).

For the simulator, a dataset referred to as the SYNTHIA dataset was used, which is described by Ros et al. in "The SYNTHIA Dataset: A Large Collection of Synthetic Images for Semantic Segmentation of Urban Scenes," hereby incorporated by reference. The SYNTHIA dataset is a dataset generated from an autonomous driving simulator of urban scenes, which provides a variety of synthetic images of urban scenes and corresponding semantic segmentation labels and depth maps. As such, for experimentation purposes the SYNTHIA dataset provided inputs of synthetic images, semantic segmentation labels and privileged information, i.e., depth maps to the SPIGAN model and the other models for comparison.

The real-world image datasets were selected from Cityscapes and Mapillary Vistas dataset. Each dataset was divided into two separate subsets, one for training the models and the other for validation. The Cityscapes dataset is a benchmark suite and large-scale dataset to train and test approaches for pixel-level and instance-level semantic labeling as described by Cordts et al. in "The Cityscapes Dataset for Semantic Urban Scene Understanding." The Mapillary Vistas dataset is a large-scale street-level image dataset of high-resolution images annotated into 66 object categories with additional, instance-specific labels for 37 classes. Neuhold et al. describe the details of the dataset in "The Mapillary Vistas Dataset for Semantic Understanding of Street Signs," incorporated herein by reference.

Additionally, all the images were converted to an image resolution of 128×356 to reduce training times and enable ablative analysis. However, scaling the SPIGAN model to a higher resolution is likely to produce similar improvements as observed herein.

The SPIGAN model, for experiment purposes was implemented in the following manner, although alternative implementations are available and considered within the scope of the present disclosure. The generator and discriminator were adapted from CycleGAN, but only a single synthetic-to-real generator (i.e., no cycle consistency) was implemented. The generator included two down-sampling convolution layers, nine ResNet blocks and two fractionally—trided convolution layers. The discriminator was adapted from a Patch-GAN network and the task predictor and the privileged information predictor utilized an FCN8s architecture. Finally, for perceptual loss, the feature was constructed by the concatenation of the activations of a pre-trained VGG19 network of layers "conv1_2", "conv2_2", "conv3_2", 'conv4_2", and "conv5_2."

The weights for the joint adversarial loss were selected as $\alpha=1$, $\beta=0.5$, $\gamma=0.1$, $\delta=0.33$ for GAN, task, privileged, and perceptual objectives respectively.

Two sets of experimental results are presented. First, the SPIGAN model was evaluated against the other methods on Cityscapes dataset using training labels from SYNTHIA as a simulator input. The quantitative results in Table 1 (below) show that the SPIGAN model outperforms the other methods by a large margin.

TABLE 1

Semantic Segmentation results (per category IoU and mean IoU) for SYNTHIA to Cityscapes adaptation. SPIGAN significantly outperforms all the unsupervised methods in almost every category and closes the syn-to-real gap by more than 59%.

| Method | flat | construction | object | nature | sky | human | vehicle | mIoU |
|---|---|---|---|---|---|---|---|---|
| FCN source (w/o PI) | 79.60 | 50.98 | 8.74 | 28.98 | 50.92 | 2.95 | 31.62 | 36.26 |
| CycleGAN + FCN (w/o PI) | 91.26 | 60.28 | 8.76 | 43.88 | 57.81 | 11.90 | 57.46 | 47.33 |
| PixelDA* (w/o PI) | 90.25 | 58.15 | 6.83 | 35.84 | 68.99 | 9.51 | 52.09 | 45.95 |
| SPIGAN (w/ PI) | 91.15 | 66.43 | 9.62 | 56.79 | 71.53 | 17.70 | 60.26 | 53.35 |
| FCN target | 95.16 | 78.35 | 9.96 | 80.11 | 82.46 | 36.99 | 0.7506 | 65.44 |

Figure 6:
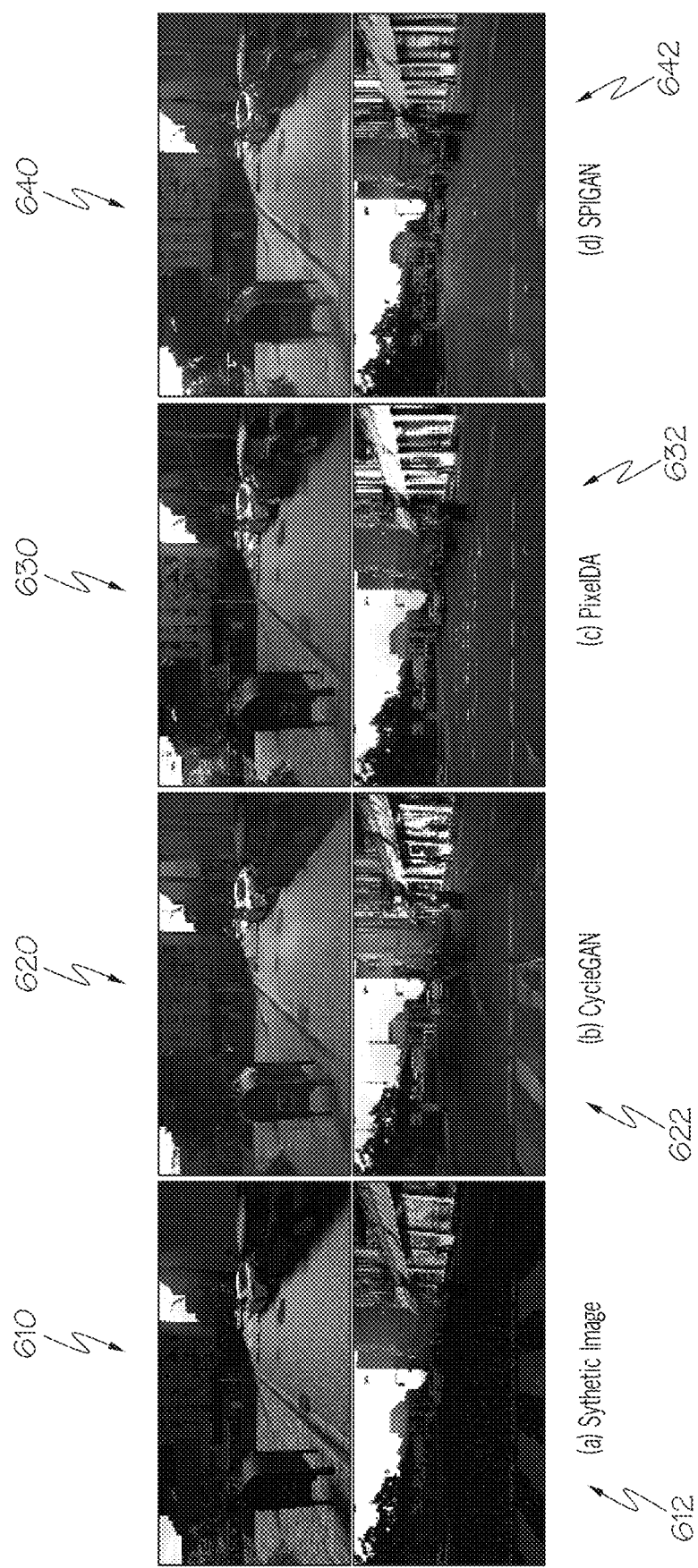
FIG. 6 depicts experimental qualitative results for three domain adaptation methods for the adaptation from SYNTHIA and to Cityscapes, according to embodiments described herein is depicted.
Figure 7:
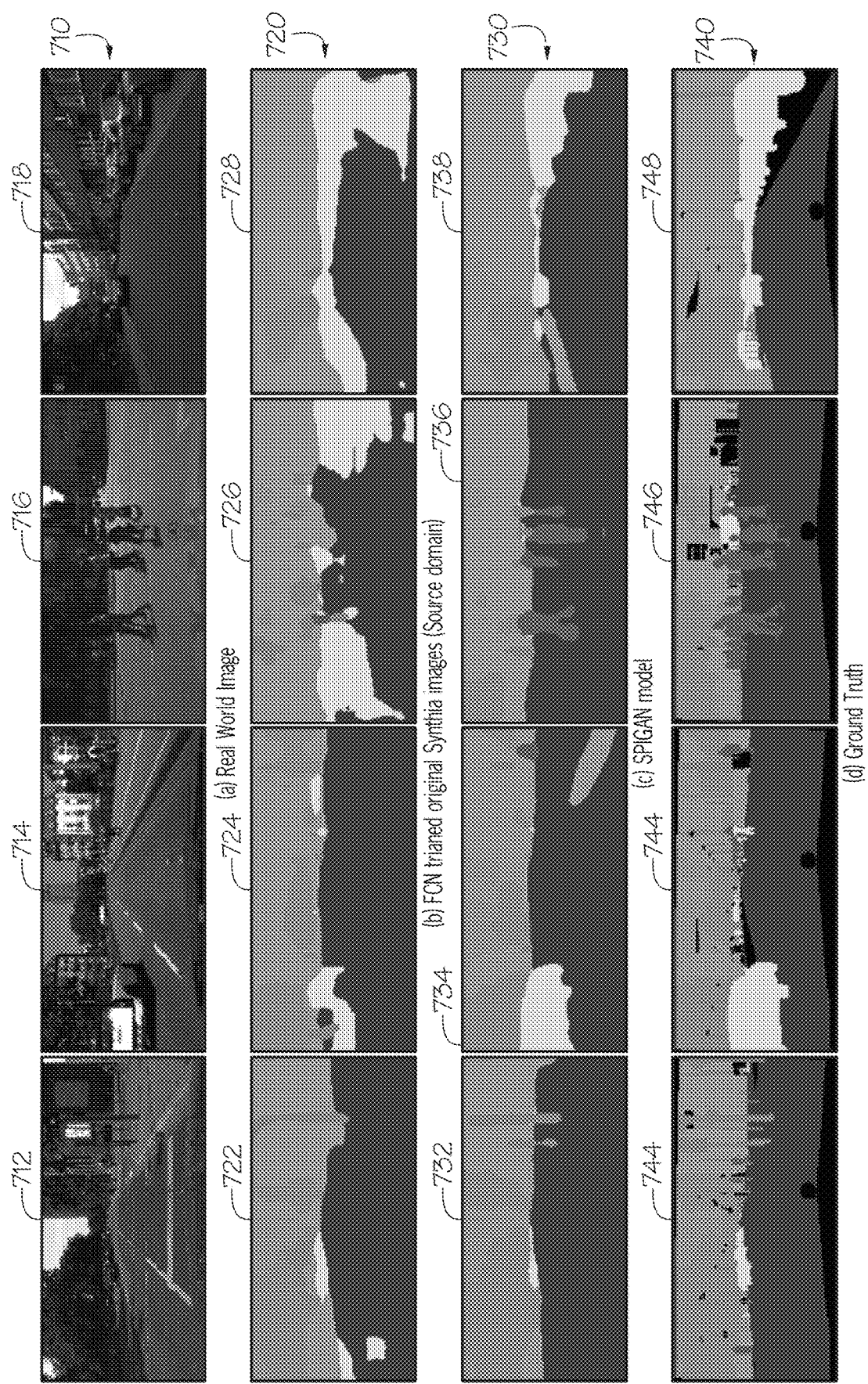
FIG. 7 depicts experimental qualitative results of semantic segmentation of the SPIGAN model as compared to others for the adaptation from SYNTHIA and to Cityscapes, according to embodiments described herein is depicted.
Figure 8:
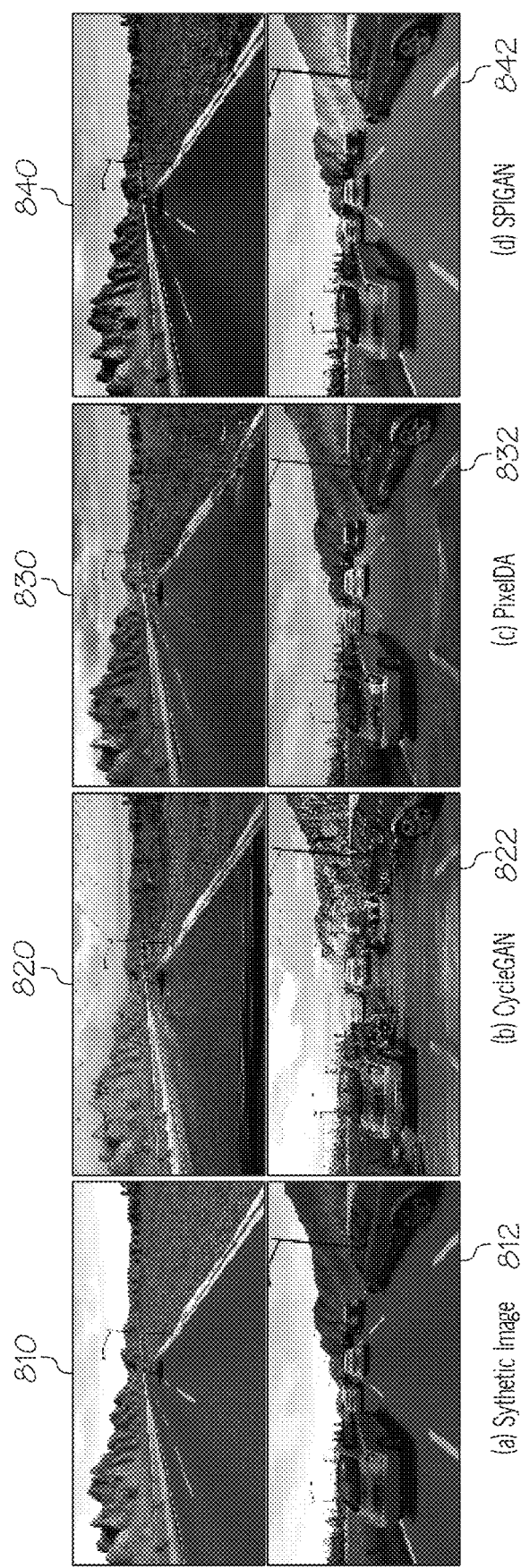
FIG. 8 depicts experimental qualitative results for three domain adaptation methods for the adaptation from SYNTHIA and to Vistas, according to embodiments described herein is depicted.

The SPIGAN model improves the FCN trained only on the source domain ("FCN source") by +17% in terms of mIoU, while CycleGAN+FCN improves it by only +11% and PixelDA by +10%. Additionally, it is observed that the SPIGAN model shows significant improvements on "nature", "construction", and "vehicle" segmentation categories. In addition, the SPIGAN model is able to improve the IoU by +15% on the "human" category, a difficult class in semantic segmentation. FIG. 6 depicts the qualitative results for the three domain adaptation methods for the adaptation from SYNTHIA 610 and 612 to Cityscapes where images 620 and 622 are generated from CycleGAN, images 630 and 632 are generated from PixleDA and images 640 and 642 are generated from the SPIGAN model. Furthermore, FIG. 7 shows that the target task predictions for all of the domain adaptation methods outperform the "FCN source" (i.e., the lower bound) as expected. Moreover, the SPIGAN model 730 achieves the closet segmentation prediction to the one presented by the ground truth 740.

Second, the SPIGAN model was evaluated against the other methods on the Mapillary Vistas dataset, which presents a larger domain gap due to the greater difference in viewpoint and a larger variety of scenarios. The domain adaptation becomes more challenging as can be observed from both quantitative results in Table 2 (below) and qualitative visualizations in FIG. 8.

TABLE 2

Semantic Segmentation results (per category IoU and mean IoU) for SYNTHIA to Vistas adaptation.

| Method | flat | construction | object | nature | sky | human | vehicle | mIoU |
| --- | --- | --- | --- | --- | --- | --- | --- | --- |
| FCN source (w/o PI) | 61.49 | 40.79 | 10.44 | 53.30 | 65.72 | 16.64 | 30.35 | 39.82 |
| CycleGAN + FCN (w/o PI) | 55.52 | 30.17 | 9.02 | 10.75 | 44.91 | 9.45 | 36.86 | 28.10 |
| PixelDA* (w/o PI) | 52.99 | 30.75 | 3.56 | 14.59 | 52.95 | 5.77 | 26.91 | 26.79 |
| SPIGAN (w/ PI) | 74.12 | 47.12 | 6.76 | 43.33 | 83.72 | 11.21 | 42.22 | 44.07 |
| FCN target | 90.44 | 76.54 | 32.79 | 82.78 | 94.85 | 40.28 | 77.36 | 70.72 |

Figure 9:
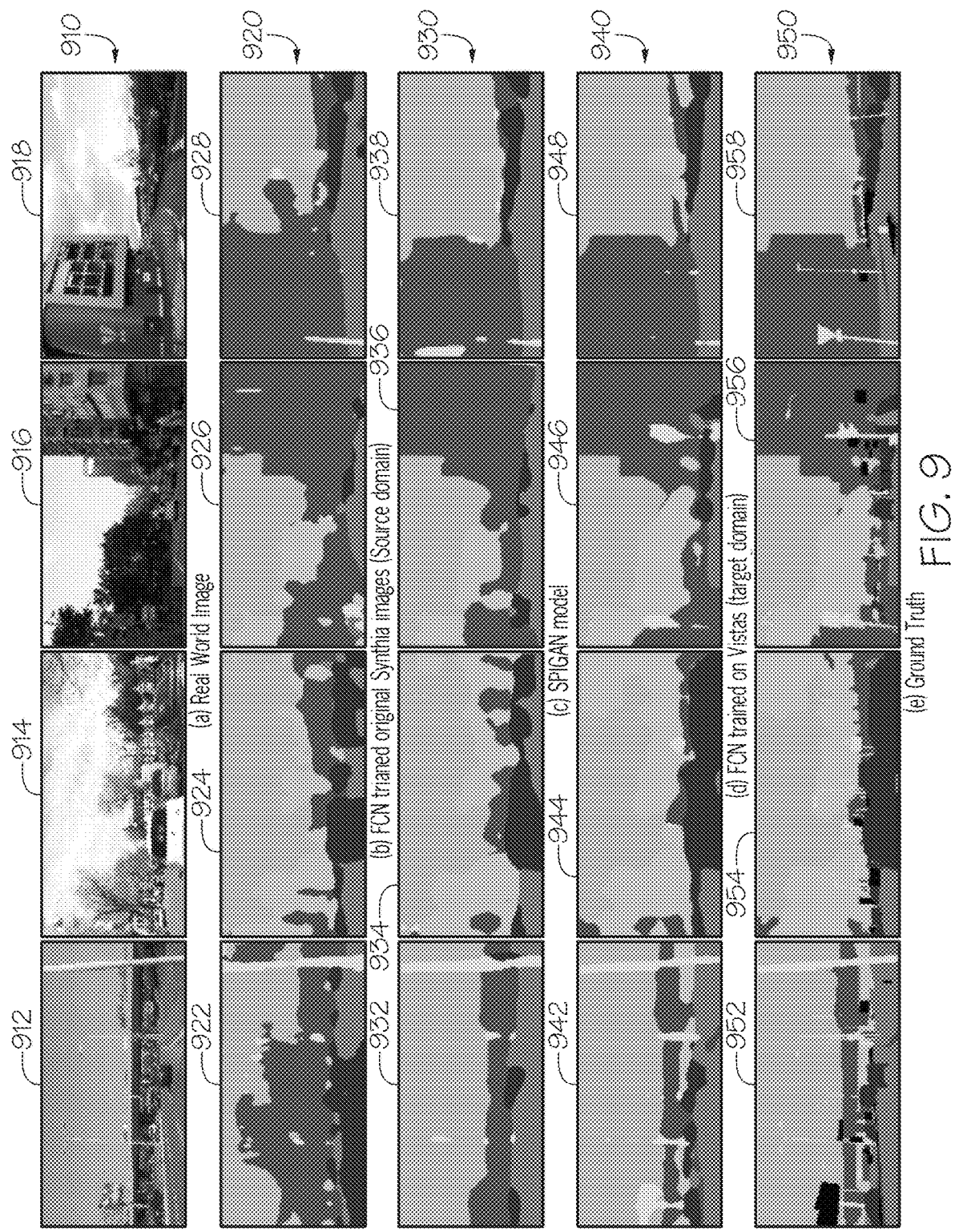
FIG. 9 depicts experimental qualitative results of semantic segmentation of the SPIGAN model as compared to others for the adaptation from SYNTHIA and to Vistas, according to embodiments described herein is depicted.

The domain adaptation between these two datasets presents more challenges to both SPIGAN and baseline methods. Both CycleGAN+FCN (−11%) and PixelDA (−13%) suffer from negative transfer and underperform the FCN source in the semantic segmentation task, (qualitative results are shown in FIG. 9). However, the SPIGAN model (+4%) is able to decrease the gap between the lower bound and the upper bound by 14%.

In order to prove the relevance of privileged information in the SPIGAN framework, the experiment was extended to include an ablation study on Cityscapes. Training a SPIGAN model with the same hyper-parameters but not using the privileged information predictor PI (i.e., by setting $\gamma=0$ in Eq. 1) leads to a mIoU of 48.31%, versus 53.35% using the PI; this is a statically significant difference of 5%, which shows that PI imposes useful constraints that promote better task-oriented training. Additionally, the amount of negative transfer was studied and measured. A negative transfer case is defined as a real-world testing sample that has a mIoU lower than the FCN source prediction (no adaptation). The results are depicted in Table 3 (below).

TABLE 3

Fraction of negative transfer cases.

| Method | Cityscapes | Vistas |
| --- | --- | --- |
| PixelDA | 0.16 | 0.80 |
| CycleGAN + FCN | 0.15 | 0.79 |
| SPIGAN | 0.09 | 0.42 |

The table summarizes those cases where the performance after domain adaptation is worse than the lower bound (model trained on the source domain), for PixelDA, CycleGAN+FCN, and SPIGAN in both Cityscapes and Vistas datasets. These results confirm the better performance of SPIGAN, including in the challenging SYNTHIA to Vistas adaptation where other methods fail.

It should be understood that the embodiments described herein are directed to systems and methods for generating photorealistic images from synthetic image data. A simulator creates the synthetic image data as well as provides semantic segmentation labels and other privileged information to the GAN model for training. The GAN model includes one or more generators, one or more discriminators, and a set of predictors. A generator learns to generate the synthetic-to-real images from a synthetic image simulated by the simulator such that the discriminator determines the synthetic-to-real image is real. The discriminator learns to determine the synthetic-to-real image from the real image, such that the generator reduces the difference between the synthetic-to-real image and the real image. The set of predictors learn to predict labeled data (e.g., semantic segmentation) and other privileged information from the synthetic-to-real image data by making a prediction of at least one of the labeled data and the privileged information from the synthetic-to-real image and updating the prediction based on at least one of the labeled data and the privileged information from the simulator. It should further be understood that the generator, discriminator and the set of predictors are jointly learned.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for generating photorealistic images comprising:
training a generative adversarial network (GAN) model by jointly learning a first generator, a second generator, a first discriminator, a second discriminator, and a set of predictors through an iterative process of optimizing a minimax objective wherein:

the first discriminator learns to determine a synthetic-to-real image from a real image, the first generator learns to generate the synthetic-to-real image from a synthetic image such that the first discriminator determines the synthetic-to-real image is real, the second generator learns to generate a real-to-synthetic image from the real image such that the second discriminator determines the real-to-synthetic image is fake, the second discriminator learns to determine the real-to-synthetic image from the synthetic image such that differences between the real-to-synthetic image and the synthetic image are minimized, and the set of predictors learn to predict at least one of a semantic segmentation labeled data and a privileged information from the synthetic-to-real image based on at least one of a known semantic segmentation labeled data and a known privileged information corresponding to the synthetic image; and generating one or more photorealistic images using the trained GAN model.

2. The method of claim 1, further comprising:

receiving, from a simulator, the synthetic image; and receiving, from the simulator, the known semantic segmentation labeled data indicating semantic segmentation within the synthetic image and the known privileged information corresponding to the synthetic image.

3. The method of claim 1, wherein optimizing the minimax objective comprises:

updating one or more parameters of the first discriminator during a first iteration of training the first generator, the first discriminator, and the set of predictors; and updating one or more parameters of the first generator and the set of predictors during a second iteration of training the first generator, the first discriminator, and the set of predictors.

4. The method of claim 1, wherein the minimax objective is characterized by a set of loss functions comprising an adversarial loss ($\mathcal{L}_{GAN}$), a task prediction loss ($\mathcal{L}_{task}$), a privileged information regularization ($\mathcal{L}_{pi}$), and a perceptual regularization ($\mathcal{L}_{perc}$):

$$\min_{\theta_G, \theta_T, \theta_P} \max_{\theta_D} \alpha \mathcal{L}_{GAN} + \beta \mathcal{L}_T + \gamma \mathcal{L}_P + \delta \mathcal{L}_{perc}$$

wherein $\alpha, \beta, \gamma, \delta$ are weighting parameters and $\theta_G$ is a generator parameter, $\theta_D$ is a discriminator parameter, $\theta_T$ is a task predictor parameter, and $\theta_{pk}$ is a privileged information predictor parameter.

5. The method of claim 1, wherein the set of predictors comprises at least one of a task network and a privileged information network.

6. The method of claim 5, wherein the task network learns to predict the semantic segmentation labeled data from the synthetic-to-real image.

7. The method of claim 5, wherein the privileged information network learns to predict at least one of depth information, optical flow information, object detection information, and instance segmentation information from the synthetic-to-real image.

8. The method of claim 1, wherein the first generator learns a pixel-level mapping function to generate the synthetic-to-real image from the synthetic image.

9. A computer-implemented system for generating photorealistic images from a synthetic image, the computer-implemented system comprising:

a processor and a non-transitory computer-readable medium storing computer readable instructions that, when executed by the processor, cause the processor to:

train a generative adversarial network (GAN) model comprising a first generator, a second generator, a first discriminator, a second discriminator, and a set of predictors by jointly learning the first generator, the second generator, the first discriminator, the second discriminator, and the set of predictors through an iterative process of optimizing a minimax objective wherein:

the first discriminator learns to determine a synthetic-to-real image from a real image, the first generator learns to generate the synthetic-to-real image from the synthetic image such that the first discriminator determines the synthetic-to-real image is real, the second generator learns to generate a real-to-synthetic image from the real image such that the second discriminator determines the real-to-synthetic image is fake, the second discriminator learns to determine the real-to-synthetic image from the synthetic image such that differences between the real-to-synthetic image and the synthetic image are minimized, and the set of predictors learn to predict at least one of a semantic segmentation labeled data and a privileged information from the synthetic-to-real image based on at least one of a known semantic segmentation labeled data and a known privileged information corresponding to the synthetic image; and generate one or more photorealistic images using the trained GAN model.

10. The computer-implemented system of claim 9, further comprising:

a simulator communicatively coupled to the GAN model wherein the simulator generates the synthetic image, the known semantic segmentation labeled data within the synthetic image, and the known privileged information corresponding to the synthetic image, wherein the non-transitory computer-readable medium, when executed by the processor, further causes the processor to:

receive, from the simulator, the synthetic image, the known semantic segmentation labeled data within the synthetic image and the known privileged information corresponding to the synthetic image for training the GAN model.

11. The computer-implemented system of claim 9, wherein optimizing the minimax objective further causes the processor to:

update one or more parameters of the first discriminator during a first iteration of training the first generator, the first discriminator, and the set of predictors; and update one or more parameters of the first generator and the set of predictors during a second iteration of training the first generator, the first discriminator, and the set of predictors.

12. The computer-implemented system of claim 9, wherein the minimax objective is characterized by a set of loss functions comprising an adversarial loss ($\mathcal{L}_{GAN}$), a task prediction loss ($\mathcal{L}_{task}$), a privileged information regularization ($\mathcal{L}_{pi}$), and a perceptual regularization ($\mathcal{L}_{perc}$):

$$\min_{\theta_G, \theta_T, \theta_P} \max_{\theta_D} \alpha \mathcal{L}_{GAN} + \beta \mathcal{L}_T + \gamma \mathcal{L}_P + \delta \mathcal{L}_{perc},$$

wherein α, β, γ, δ are weighting parameters and $\theta_G$ is a generator parameter, $\theta_D$ is a discriminator parameter, $\theta_T$ is a task predictor parameter, and $\theta_{pk}$ is a privileged information predictor parameter.

13. The computer-implemented system of claim 9, wherein the set of predictors comprises at least one of a task network and a privileged information network.

14. The computer-implemented system of claim 13, wherein the task network learns to predict the semantic segmentation labeled data from the synthetic-to-real image.

15. The computer-implemented system of claim 13, wherein the privileged information network learns to predict at least one of depth, optical flow, object detection, and instance segmentation from the synthetic-to-real image.

16. The computer-implemented system of claim 9, wherein the first generator learns a pixel-level mapping function to generate the synthetic-to-real image from the synthetic image.

17. A method for generating photorealistic images comprising:
    training a generative adversarial network (GAN) model by jointly learning a first generator, a second generator, a first discriminator, a second discriminator, and a set of predictors through an iterative process comprising the steps of:
        generating, with the first generator, a synthetic-to-real image from a synthetic image simulated by a simulator;
        determining, with the first discriminator, whether the synthetic-to-real image is real or fake and whether a real image from a dataset of real images is real or fake;
        predicting, with the set of predictors, at least one of a labeled data and privileged information from the synthetic-to-real image; and
        training the first generator, the second generator, the first discriminator, the second discriminator, and the set of predictors by optimizing a minimax objective wherein:
            the first generator learns to generate the synthetic-to-real image from the synthetic image simulated by the simulator such that the first discriminator determines the synthetic-to-real image is real,
            the first discriminator learns to determine the synthetic-to-real image from the real image, such that differences between the synthetic-to-real image and the real image are minimized,
            the second generator learns to generate a real-to-synthetic image from the real image such that the second discriminator determines the real-to-synthetic image is fake,
            the second discriminator learns to determine the real-to-synthetic image from the synthetic image such that differences between the real-to-synthetic image and the synthetic image are minimized, and
            the set of predictors learn to predict at least one of the labeled data and the privileged information from the synthetic-to-real image based on at least one of the labeled data and the privileged information from the simulator.

18. The method of claim 17, further comprising:
    updating one or more parameters of the first discriminator during a first iteration of training the first generator, the first discriminator, and the set of predictors; and
    updating one or more parameters of the first generator and the set of predictors during a second iteration of training the first generator, the first discriminator, and the set of predictors.

19. The method of claim 17, wherein the set of predictors comprises at least one or a task network and a privileged information network wherein the task network learns to predict a semantic segmentation from the synthetic-to-real image and the privileged information network learns to predict at least one of depth, optical flow, object detection, and instance segmentation from the synthetic-to-real image.

* * * * *

UNITED STATES PATENT AND TRADEMARK OFFICE
CERTIFICATE OF CORRECTION

PATENT NO. : 10,643,320 B2
APPLICATION NO. : 15/893864
DATED : May 5, 2020
INVENTOR(S) : Kuan-Hui Lee et al.

It is certified that error appears in the above-identified patent and that said Letters Patent is hereby corrected as shown below:

In page 2, Column 2, item (56), Other Publications Documents, cite no. 10, delete "Eigen, et al., "Predicting Depth, Surface Normals and Semantic Labels with a Common Multt-Scale Convolutional Architecture," https://arXiv.org/abs/1411.4734 Published Nov. 18, 2014." and insert --Eigen, et al., "Predicting Depth, Surface Normals and Semantic Labels with a Common Multi-Scale Convolutional Architecture," https://arXiv.org/abs/1411.4734 Published Nov. 18, 2014.--, therefor.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*